United States Patent
Burley

(10) Patent No.: US 6,824,103 B2
(45) Date of Patent: Nov. 30, 2004

(54) CONVERTIBLE DUAL TAXILANE

(75) Inventor: James R. Burley, Redondo Beach, CA (US)

(73) Assignee: United Airlines, Inc., Elk Grove Township, IL (US)

( * ) Notice: Subject to any disclaimer, the term of this patent is extended or adjusted under 35 U.S.C. 154(b) by 0 days.

(21) Appl. No.: 10/153,465

(22) Filed: May 21, 2002

(65) Prior Publication Data

US 2002/0145079 A1 Oct. 10, 2002

Related U.S. Application Data

(63) Continuation of application No. 09/615,992, filed on Jul. 14, 2000, now abandoned.

(51) Int. Cl.[7] .................................................. B64F 1/36
(52) U.S. Cl. .................................................. 244/114 R
(58) Field of Search ............................ 244/114 R, 115, 244/116, 134 C, 137.1; 114/258, 261, 262; 404/12, 9

(56) References Cited

U.S. PATENT DOCUMENTS

| | | | |
|---|---|---|---|
| 5,718,534 A | | 2/1998 | Neuling |
| 6,086,014 A | * | 7/2000 | Bragg, Jr. .................. 244/2 |
| 6,149,341 A | * | 11/2000 | Neuling .................. 280/400 |

FOREIGN PATENT DOCUMENTS

| | | |
|---|---|---|
| DE | 869003 | 3/1953 |
| DE | 37 16050 A1 | 12/1988 |
| FR | 677696 | 3/1930 |

OTHER PUBLICATIONS www.dmv.ca.gov/pubs/hdbk/pgs25thru29.htm, California Drivers Handbook.*
www.dps.state.al.us/dl/dm/chapter05.html, Alabama Drivers Handbook, Chapter 5.*
www.us-highways.com/trtdr00.htm, The Right to Drive Right, the Drivers Handbook for Detroit, Michigan in 1937.*

* cited by examiner

Primary Examiner—Peter M. Poon
Assistant Examiner—Timothy D. Collins
(74) Attorney, Agent, or Firm—Brinks Hofer Gilson & Lione

(57) ABSTRACT

A convertible dual taxilane (20) for guiding aircraft (22) from an aircraft parking position (30) to a taxiway (32) and for guiding aircraft (22) from the taxiway (32) to the aircraft parking position (30). The taxilane (20) includes a first boundary line (34) opposed to a second boundary line (36), wherein the taxilane (20) is located between the first and second boundary lines (34, 36). A centerline (38) is located in the taxilane (20), wherein the centerline (38) is generally centered between the first and second boundary lines (34, 36). The taxilane (20) also includes a first taxiline (42) located in the taxilane (20), wherein the first taxiline (42) is generally centered between the first boundary line (34) and the centerline (38) and a second taxiline (44) is located in the taxilane (20), wherein the second taxiline (44) is generally centered between the second boundary line (36) and the centerline (38).

9 Claims, 5 Drawing Sheets

US 6,824,103 B2

CONVERTIBLE DUAL TAXILANE

RELATED APPLICATIONS

This application is a continuation of application Ser. No. 09/615,992, filed Jul. 14, 2000, now abandoned, which is hereby incorporated by reference herein.

FIELD OF THE INVENTION

This invention relates, in general, to a taxilane for guiding aircraft to and from an aircraft parking position and, more particularly, to a convertible dual taxilane for guiding aircraft from an aircraft parking position to a taxiway and for guiding aircraft from the taxiway to the aircraft parking position.

BACKGROUND

In recent years, the development and growth of shuttle operations has placed a strain on both airside and terminal capacity of some of the airports at which these Shuttle operations operate. Much of the strain is due to the layout of the taxilanes within the airport. Taxilanes are the portion of the aircraft parking area used for access between taxiways and aircraft parking positions. The taxiways are the strips of road that connect the taxilanes to the runways and the aircraft parking positions are the locations in which the aircraft are parked when passengers are to leave and exit the plane. Taxilanes connect the taxiways to the aircraft parking positions. Typically, aircraft are required to travel in only one direction down a single taxilane. Therefore, aircraft can travel from the aircraft parking positions to the taxiways or from the taxiways to the aircraft parking positions, however, multiple aircraft cannot be simultaneously traveling from the aircraft parking positions to the taxiways and from the taxiways to the aircraft parking positions. Moreover, since single taxilanes are designed as a single lane, aircraft must follow each other in a single file line down the taxilane. While many single taxilanes are wide enough to allow two aircrafts to go down the taxilane side-by-side, the taxilanes are not designed for such operation, since single taxilanes have a width that is governed by the widest plane to travel down the taxilane.

The design of a single lane taxilane is disadvantageous in some airports since its severely limits the amount of aircraft that can enter and leave the taxilane. First, the taxilane limits all aircraft within the taxilane to traveling in the same direction. Therefore, if an aircraft needs to leave the aircraft parking position and enter the taxiway, other aircraft that wish to enter the taxilane must wait until the taxilane is clear of any aircraft before entering. Similarly, if an aircraft needs to enter the aircraft parking position and leave the taxiway, other aircraft that wish to leave the aircraft parking position and enter the taxiway must wait until the taxilane is clear of aircraft. Because of high congestion and traffic, in some airports, aircraft waiting to enter the taxilane are often taxied out to a different area of the airport until the taxilane is cleared. This increases the amount of time the passengers must stay on the aircraft and reduces the number of flights an airport can handle at one time. Additionally, aircraft waiting to leave the taxilane must also wait until the taxilane is clear. This also increases the amount of time the passengers must stay on the aircraft and reduces the number of flights an airport can handle at one time.

Accordingly, further development of taxilanes for guiding aircraft to and from an aircraft parking position and methods for guiding aircraft from the taxiway to the aircraft parking position, is necessary in order to decrease congestion in the airport, decrease the amount of time the passengers must stay on the aircraft, and increase the number of flights an airport can handle at one time.

SUMMARY

In view of the above limitations of existing taxilanes for guiding aircraft to and from an aircraft parking position, it is an aspect of the present invention to provide a convertible dual taxilane for guiding aircraft from an aircraft parking position to a taxiway and for guiding aircraft from the taxiway to the aircraft parking position. The taxilane includes a first boundary line opposed to a second boundary line, wherein the taxilane is located in between the first and second boundary lines. A centerline is located in the taxilane, wherein the centerline is generally centered between the first and second boundary lines. The taxilane also includes a first taxiline located in the taxilane, wherein the first taxiline is generally centered between the first boundary line and the centerline and a second taxiline is located in the taxilane, wherein the second taxiline is generally centered between the second boundary line and the centerline, wherein at least one aircraft can be guided down one of the centerline, the first taxiline, and the second taxiline.

Unlike other taxilanes, the convertible dual taxilane of this invention allows multiple aircraft to travel in multiple directions simultaneously. By having a first and second taxilines, some aircraft are able to travel from the aircraft parking position to the taxiway, while at the same time other aircraft are able to travel from the taxiway to the aircraft parking position, thus decreasing congestion in the airport, decreasing the amount of time the passengers must stay on the aircraft, and increasing the number of flights an airport can handle at one time.

Figure 1:
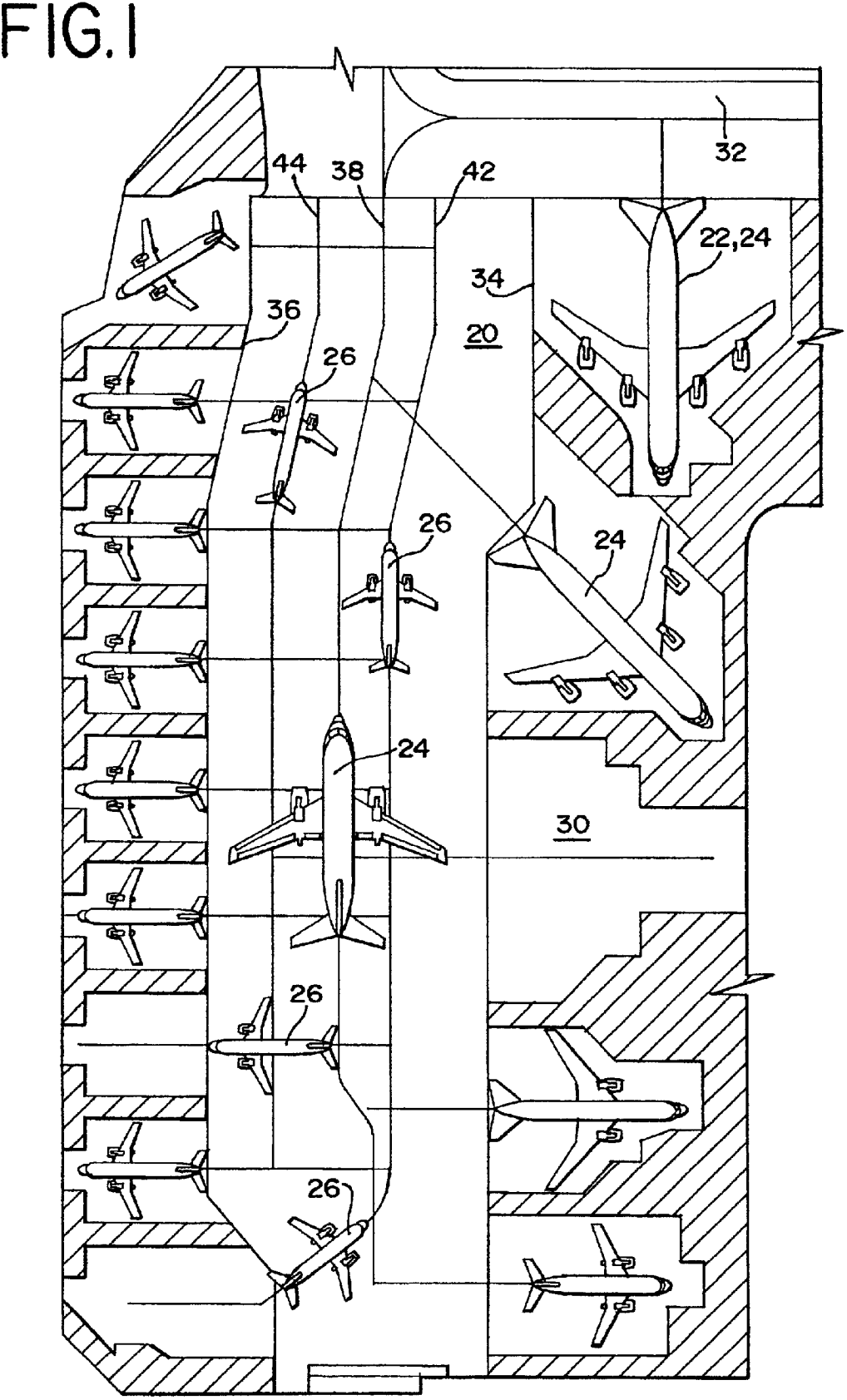
FIG. 1 is an overhead plan view of a convertible dual taxilane, according to one preferred embodiment.

For simplicity and clarity of illustration, elements shown in the Figures have not necessarily been drawn to scale. For example, dimensions of some elements are exaggerated relative to each other. Further, when considered appropriate, reference numerals have been repeated among the Figures to indicate corresponding elements.

DETAILED DESCRIPTION

Shown in FIG. 1 an overhead plan view of convertible dual taxilane 20, according to one preferred embodiment.

Convertible dual taxilane 20 guides aircraft 22 from an aircraft parking position 30 to a taxiway 32 and from the taxiway 32 to the aircraft parking position 30, as illustrated in FIG. 1. Aircraft 22 may include any airplanes, such as, wide body airplanes such as the Boeing 747, Boeing 757, Boeing 767, Boeing 777, and Airbus A340, small body airplanes, such as the Boeing, 707, Boeing 727, Boeing 737, DC8, DC9, Airbus A319, and Airbus A320, helicopters, hovering craft, or any flying craft. Aircraft 22 includes large aircraft 24 and small aircraft 26, as described herein. In designing taxilanes, the width $C_1$ of a taxilane is determined by the types of planes the taxilane is designed for and whether the taxilane is a parallel taxilane or a single taxilane. Typically, in the United States, a single taxilane has a width defined as 1.2 times the wingspan of the largest airplane the taxilane is designed for plus 20 feet, as defined by the U.S. Department of Transportation. So therefore, if a single taxilane is designed to fit a Boeing 777 aircraft having a 207 foot wingspan, then that taxilane must be at least 268.4 feet (1.2*207+20=268.4) in width. Moreover, a parallel taxilane in the United States typically has a width of 2.3 times the wingspan of the largest airplane the taxilane is designed for plus 30 feet, as defined by the U.S. Department of Transportation. So therefore, if a parallel taxilane is designed to fit a Boeing 737 aircraft having a 95 foot wingspan, then the taxilane must be at least 248.5 feet (2.3*95+=248.5) in width.

Typically, taxilanes are designed to be either single taxilanes that carry planes in a single file line in one direction or a parallel taxilane that carries planes in two single file lines in one or two directions. Convertible dual taxilane 20 is both a single taxilane and a parallel taxilane, in that convertible dual taxilane 20 is a single taxilane with aircraft that have a wingspan that exceeds the allowable tolerances for parallel taxilane operation, and convertible dual taxilane 20 becomes a parallel taxilane with aircraft that meet the allowable tolerances for parallel taxilane operation. For example, if convertible dual taxilane 20 has a width of 300 feet, convertible dual taxilane 20 would operate as a single taxilane with respect to aircraft 22 which require a parallel taxilane having a width of greater than 300 feet, such as the Boeing 777, since the Boeing 777 requires a taxilane of 506.1 feet (2.3*207+506.1) to operate as a parallel taxilane. However, if convertible dual taxilane 20 has a width of 300 feet, convertible dual taxilane 20 would operate as a parallel taxilane with respect to aircraft 22 which require a parallel taxilane having a width of less than 300 feet, such as the Boeing 737, since the Boeing 737 requires a taxilane having a width of 248.5 feet (2.3*95+=248.5) to operate as a parallel taxilane. The clearances required for single or parallel taxilane operation and the definitions of a single or parallel taxilane are determined by each country, and therefore are not limited to the above stated requirements, which are just for the United States.

Figure 2:
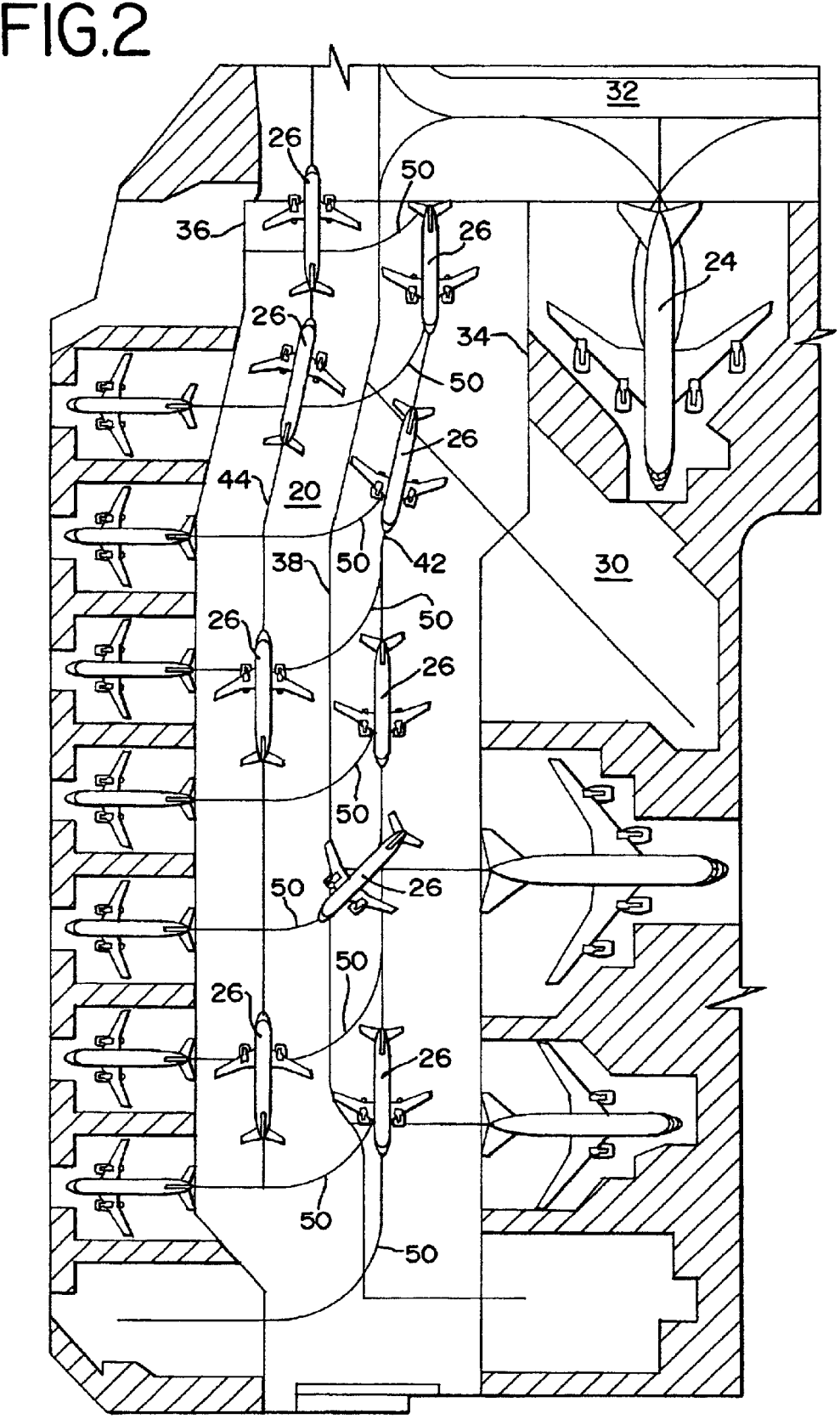
FIG. 2 is an overhead plan view of a convertible dual taxilane, according to another preferred embodiment.
Figure 3:
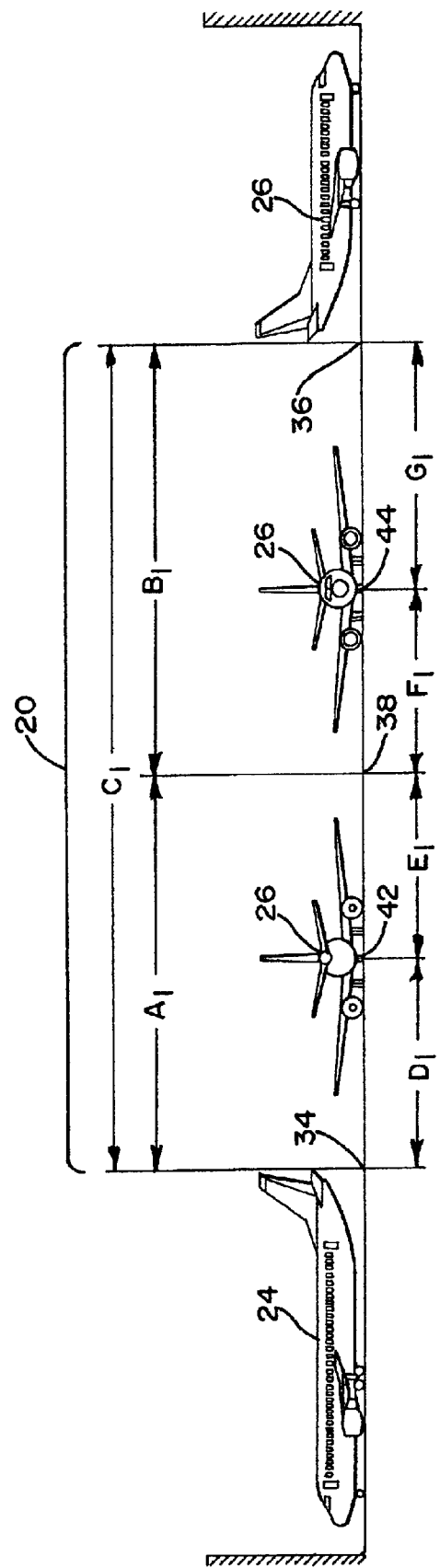
FIG. 3 is a side view of the convertible dual taxilane shown in FIG. 2, according to one preferred embodiment.
Figure 4:
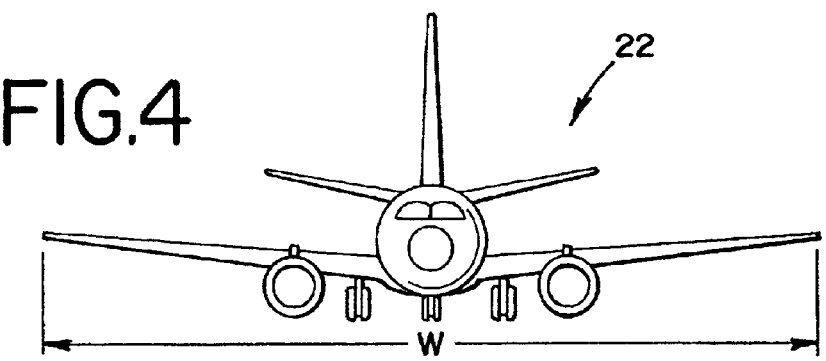
FIG. 4 is a front view of an aircraft, according to one preferred embodiment.
Figure 5:
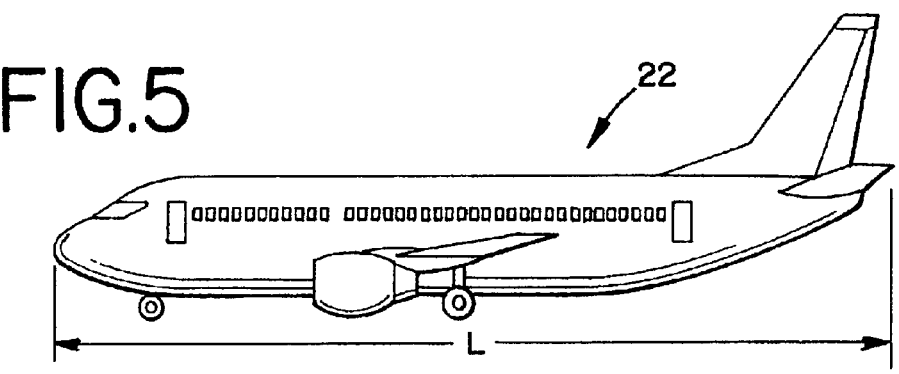
FIG. 5 is a side view of an aircraft, according to one preferred embodiment.
Figure 6:
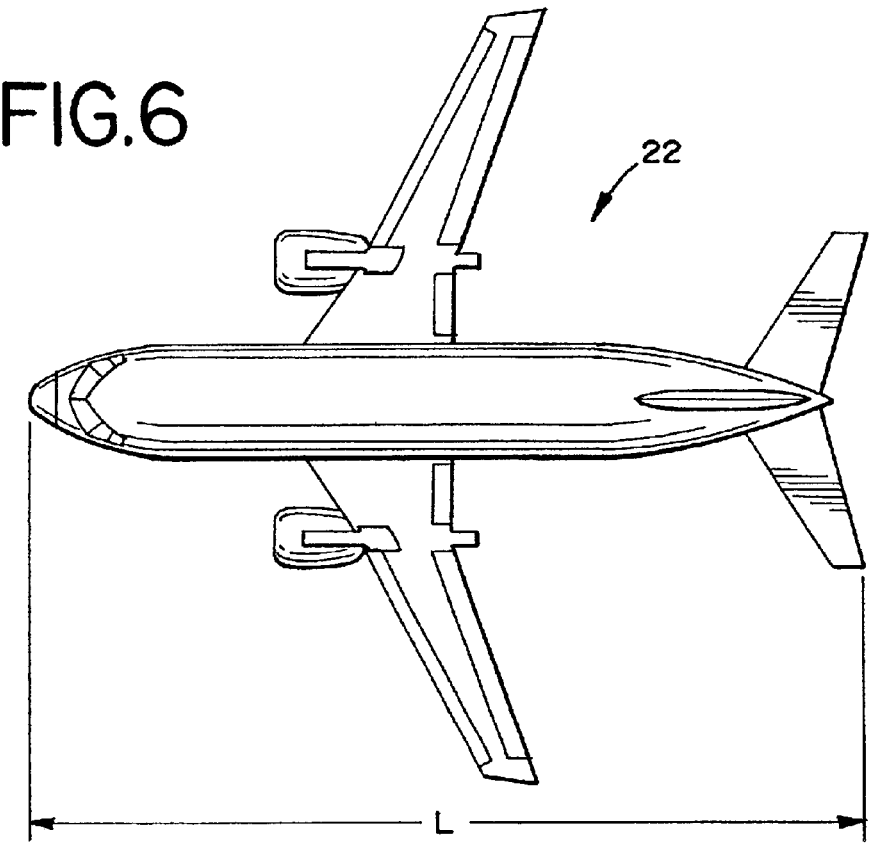
FIG. 6 is a overhead view of an aircraft, according to one preferred embodiment.

Convertible dual taxilane 20 includes a first boundary line 34, a second boundary line 36, a centerline 38, a first taxiline 42, and a second taxiline 44. First boundary line 34 is opposed to second boundary line 36, wherein the taxilane 20 is located in between the first and second boundary lines 34, 36. The width $C_1$ of taxilane 20 is defined as the distance between first boundary line 34 and second boundary line 36, as illustrated in FIG. 3. First boundary line 34 and second boundary line 36 define the boundaries and the width of taxiline 20. Centerline 38 is located in taxilane 20, wherein centerline 38 is generally centered between the first and second boundary lines 34, 36, as illustrated in FIGS. 1–3. As defined herein, if a object is defined as being generally centered between two lines, the distance between the object and the first line is equal to the distance between the object and the second line to within ±15%. This means that the distance $A_1$ between centerline 38 and first boundary line 34 is generally equal to the distance $B_1$ between centerline 38 and second boundary line 36 to within ±15%, as illustrated in FIG. 3. However, the distance $A_1$ can be much greater than or much less than the distance $B_1$ depending on the geometrical constraints of the airport and the terminals around taxilane 20.

First taxiline 42 is located in taxilane 20, wherein the first taxiline 42 is generally centered between the first boundary line 34 and the centerline 38. This means that the distance $D_1$ between first taxiline 42 and first boundary line 34 is generally equal to the distance $E_1$ between first taxiline 42 and centerline 38 to within +/−15%, as illustrated in FIG. 3. However, the distance $D_1$ can be much greater than or much less than the distance $E_1$ depending on the geometrical constraints of the airport and the terminals around taxilane 20. Second taxiline 44 located in the taxilane 20, wherein the second taxiline 44 is generally centered between the second boundary line 36 and the centerline 38. This means that the distance $F_1$ between second taxiline 44 and centerline 38 is generally equal to the distance $G_1$ between second taxiline 44 and second boundary line 36 to within ±15%, as illustrated in FIG. 3. However, the distance $F_1$ can be much greater than or much less than the distance $G_1$ depending on the geometrical constraints of the airport and the terminals around taxilane 20.

Figure 7:
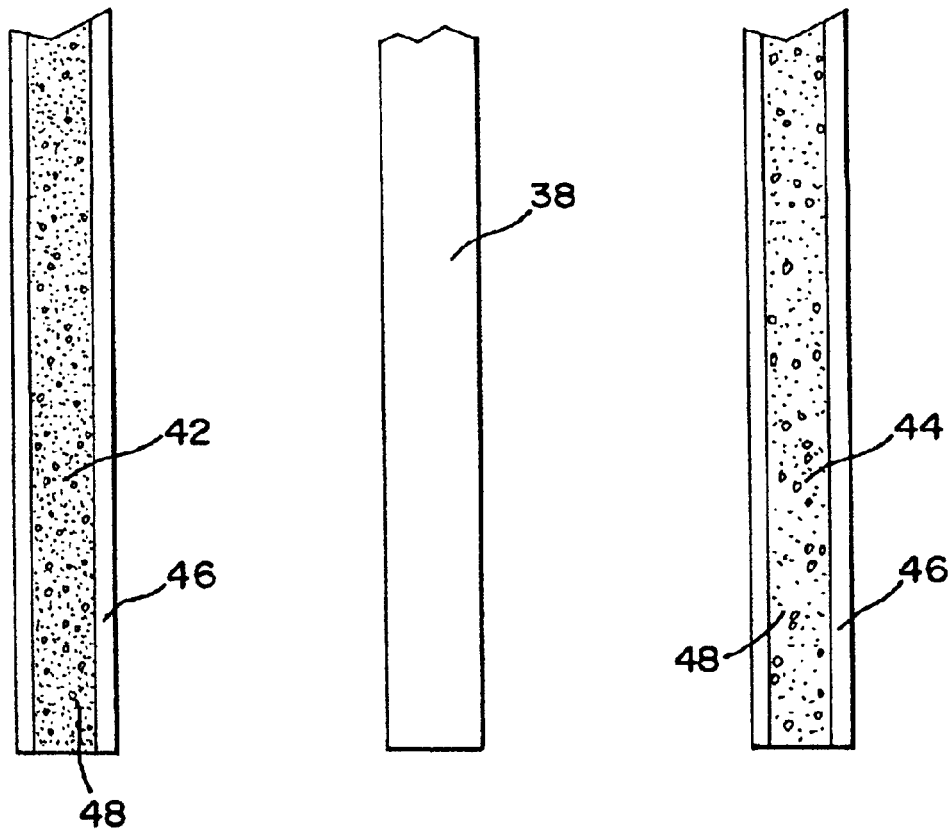
FIG. 7 is an enlarged plan view of a portion of a convertible dual taxilane, according to one preferred embodiment.
Figure 8:
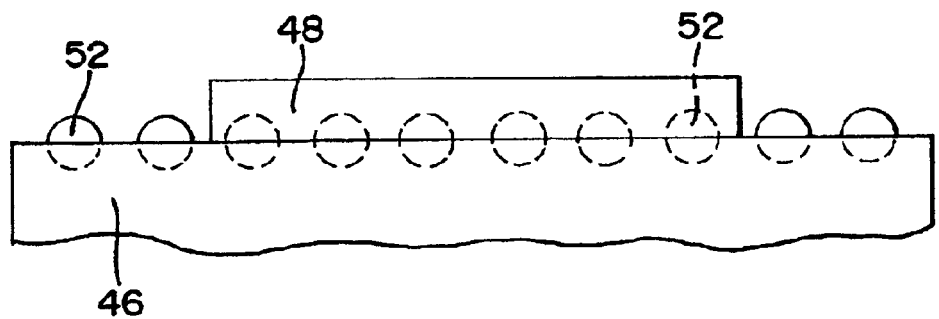
FIG. 8 is an enlarged side view of a taxiline, according to one preferred embodiment.

Preferably, first taxiline 42 and second taxiline 44 include an outer line 46 and an inner line 48 located within the boundary of the outer line 46, as illustrated in FIG. 7. More preferably, outer line 46 includes reflective white paint or white paint with glass beads 52, and inner line 48 is painted in a fluorescent or highly reflective color, as illustrated in FIG. 8. In one preferred embodiment, inner line 48 is painted in robin egg blue or fluorescent orange. The types of colors that inner line 48 is painted depend on the type of light illuminating the taxilane 20. By placing inner line 48 within the boundary of the outer line 46, and by painting outer line 46 in white, outer line 46 is able to act as a point of reference to allow a person viewing first taxiline 42 or second taxiline 44 to more accurately see the color of first taxiline 42 or second taxiline 44. Outer line 46 is preferably between about 10 inches and about 14 inches in width, and inner line 48 is preferably generally centered over outer line 46 and between about 6 inches and about 10 inches in width. Preferably, when painting first and second taxilines 42, 44, outer line 46 is painted first, and then a layer of glass beads 52 is applied over outer line 46, as illustrated in FIG. 8. Then, inner line 48 is painted over outer line 46 and a portion of the glass beads 52. Centerline 38 may be painted using the same method as first taxiline 42 or second taxiline 44, but preferably includes a different color. In one preferred embodiment, centerline 38 includes a phosphorus yellow line that is between about 6 inches and about 14 inches in width.

In operation, at least one aircraft 22 can be guided down one of the centerline 38, the first taxiline 42, and the second taxiline 44, as illustrated in FIGS. 1–2. Convertible dual taxilane 20 can be used as both a single or parallel taxiway depending on the size of the aircraft being used on taxilane 20. Since taxilane 20 includes three lines in which airplanes can be guided down, centerline 38, the first taxiline 42, and the second taxiline 44, taxilane 20 can be used to guide a variety of aircraft in a variety of ways. Taxilane 20 can guide both large aircraft 24 and small aircraft 26. As defined herein, a large aircraft 24 is an aircraft that has a wingspan that is large enough that requires taxilane 20 to operate as a single taxilane since the width $C_1$ of taxilane 20 is insufficient for parallel taxilane operation. Single and parallel taxilane requirements are based upon the aircraft's wingspan W, the width of the taxilane $C_1$, and the general requirements of each country. For example, as described above, in the United States a parallel taxilane typically has a width of 2.3 times the wingspan of the largest airplane the taxilane is designed for plus 30 feet, as defined by the U.S. Department of Transportation. Therefore, in the United States, taxilane 20 would operate as a single taxilane with a large aircraft 24 that would not meet these requirements Large aircraft 24 are guided down centerline 38. If a large aircraft 24 is being guided down taxilane 20, taxilane 20 is only able to guide aircraft 22 in one direction, as illustrated in FIG. 1. As defined herein, a small aircraft 26 is an aircraft that has a wingspan that is small enough that allows taxilane 20 to operate as a parallel taxilane since the width $C_1$ of taxilane 20 is sufficient for parallel taxilane operation. Therefore, in the United States, taxilane 20 would operate as a parallel taxilane with a small aircraft 26 that would not meets the requirements for parallel taxilane as stated above. If a small aircraft 26 is being guided down taxilane 20, taxilane 20 is able to guide aircraft 22 in two directions, as illustrated in FIG. 2. Small aircraft 26 are guided down at least one of the first taxiline 42 or the second taxiline 44.

By being able to operate as both a single and a parallel taxilane, depending on the type of aircraft located on taxilane 20, taxilane 20 is able to increase the amount of aircraft entering and exiting from taxilane 20. Taxilane 20 may be used to guide aircraft down centerline 38, first taxiline 42, and second taxiline 44 in a variety of way know to those of skill in the art. For example, taxilane 20 may be used to guide at least one aircraft 22 down first taxiline 42 and at least one aircraft 22 down second taxiline 44, as illustrated in FIGS. 1–2. Taxilane 20 may also be used to guide at least one small aircraft 26 down first taxiline 42 towards taxiway 32 and at least one small aircraft 26 down second taxiline 44 towards taxiway 32, as illustrated in FIG. 1. Taxilane 20 may also be used to guide at least one small aircraft 26 down first taxiline 42 towards aircraft parking position 30 and at least one small aircraft 26 down second taxiline 44 towards taxiway 32, as illustrated in FIG. 2. Taxilane 20 may also be used to guide at least one large aircraft 24 down centerline 38 and at least one small aircraft 26 down first taxiline 42 and/or second taxiline 44, wherein the large aircraft 24 and the small aircraft 26 are all going in the same direction, as illustrated in FIG. 1. Taxilane 20 may also be used to guide an aircraft 22 from one taxiline 42, 44 or centerline 38 to a second taxiline 42,44 or to centerline 38.

In one preferred embodiment, taxilane 20 includes at least one curved lead-in line 50, as illustrated in FIG. 2. Curved lead-in lines 50 are connected to first taxiline 42 and/or second taxiline 44. Curved lead-in lines 50 are directed from one of the first and second taxilines 42, 44 to an aircraft parking position 30 and are used for redirecting the airflow from a turning aircraft 22 on the convertible dual taxilane 20.

In one preferred embodiment, multiple convertible dual taxilanes 20 are used in parallel. Multiple convertible dual taxilanes 20 are separated by a road in between them to provide clearance between each convertible dual taxilanes 20. While the above embodiments have been described with respect to a taxilane, the invention may also be applied to a taxiway as well, and be able to guide aircraft 22 from runways to a taxilane.

Thus it is apparent that there it has been provided in accordance with the invention a convertible dual taxilane for guiding aircraft from an aircraft parking position to a taxiway and for guiding aircraft from the taxiway to the aircraft parking position that fully provides the advantage set forth above. Although the invention has been described and illustrated with reference to specific illustrated embodiments thereof, it is not intended that the invention be limited to those illustrated embodiments. Those skilled in the art would recognize that variations and modifications can be made without departing from the spirit of the invention.

What is claimed is:

1. An airport terminal comprising:
   at least one aircraft parking position;
   a taxiway;
   a convertible dual taxilane connecting the taxiway to the aircraft parking position, the convertible dual taxilane comprising:
      a first boundary line opposed to a second boundary line, wherein the taxilane is located between the first and second boundary lines and wherein the first and second boundary lines define a width of the taxilane, said width being at least as great as a wingspan of a large type of aircraft;
      a centerline located in the taxilane, wherein the centerline is generally centered between the first and second boundary lines;
      a first taxiline located in the taxilane, wherein the first taxiline is generally centered between the first boundary line and the centerline;
      a second taxiline located in the taxilane, wherein the second taxiline is generally centered between the second boundary line and the centerline, wherein the centerline is spaced apart from the first boundary line and from the second boundary line by a distance at least as great as a wingspan of a small type of aircraft; and
      wherein the large type of aircraft may be guided along the centerline and first and second ones of the small type of aircraft may be guided along respective ones of the taxilines so as to pass without interference.

2. The airport terminal of claim 1, wherein the centerline comprises a line that is between about 6 inches and about 14 inches in width.

3. The airport terminal of claim 1, wherein the first taxiline comprises a white line having glass beads that is between about 10 inches and 14 inches in width, and a colored line generally centered over the white line that is between about 6 inches and about 10 inches in width.

4. The airport terminal of claim 1, wherein the distance between the first boundary line and the second boundary line is less than 300 feet.

5. The airport terminal of claim 1, further comprising a curved lead-in line from one of the first and second taxilines to the aircraft parking position for redirecting the airflow from an aircraft on the convertible dual taxilane.

6. The airport terminal of claim 1, further comprising a first arrow located on the first taxiline for directing an aircraft into the taxilane and a second arrow located on the second taxiline for directing an aircraft out of the taxilane.

7. The airport terminal of claim 1 wherein the centerline is marked with a first type of marking and at least one of the first and second taxilines is marked with a second type of marking visually distinguishable from the first type of marking.

8. A method of increasing traffic capacity of an aircraft taxilane for use by both a small type of aircraft and a large type of aircraft, the method comprising:
   defining a taxilane with first and second opposing boundary lines spaced apart by a distance at least as great as a wingspan of the large type of aircraft;

marking a centerline of the taxilane;

marking first and second taxilines on respective sides of the centerline, the taxilines separated by a distance at least as great as a wingspan of the small type of aircraft;

guiding the large type of aircraft in the taxilane along the centerline;

guiding the small type of aircraft in the taxilane along one of the first and second taxilines such that first and second ones of the small type of aircraft guided along respective ones of the taxilines may pass in the taxilane without interference.

9. A method of regulating aircraft traffic at an airport terminal comprising:

defining at least one aircraft parking position defining a taxiway;

defining a taxilane connecting the taxiway to the aircraft parking position with first and second opposing boundary lines;

marking a centerline of the taxilane with a first type of marking, the centerline being generally centered between the first and second boundary lines;

marking a first taxiline with a second type of marking visually distinguishable from the first type of marking, the first taxiline located between the centerline and the first boundary line;

marking a second taxiline, the second taxiline located between the centerline and the second boundary line;

wherein a distance between the first and second boundary lines is sufficient to accommodate a large type of aircraft being guided along the centerline and wherein a distance between the first and second taxilines is sufficient to accommodate first and second ones of a small type of aircraft being guided along respective ones of the taxilines so as to pass without interference.

* * * * *